United States Patent
Brown et al.

(10) Patent No.: US 6,533,315 B2
(45) Date of Patent: Mar. 18, 2003

(54) TONGUE ASSEMBLY AND BUCKLE FOR INFLATABLE SEAT BELT

(75) Inventors: Louis R. Brown, Oxford, MI (US); Arnold J. Herberg, Davisburg, MI (US); David J. Romeo, Fountain Hills, AZ (US); Brent K. Olson, Chandler, AZ (US)

(73) Assignees: TRW Vehicle Safety Systems Inc., Lyndhurst, OH (US); Simula, Inc., Phoenix, AZ (US)

( * ) Notice: Subject to any disclaimer, the term of this patent is extended or adjusted under 35 U.S.C. 154(b) by 0 days.

(21) Appl. No.: 09/907,257

(22) Filed: Jul. 17, 2001

(65) Prior Publication Data

US 2003/0015863 A1 Jan. 23, 2003

(51) Int. Cl.[7] .............................................. B60R 21/18
(52) U.S. Cl. ..................... 280/733; 280/801.1; 280/808
(58) Field of Search ......................... 280/728.1, 730.1, 280/730.2, 733, 801.1, 803, 807

(56) References Cited

U.S. PATENT DOCUMENTS

| | | | |
|---|---|---|---|
| 3,791,670 A | | 2/1974 | Lucore et al. |
| 3,820,842 A | * | 6/1974 | Stephenson .................. 297/389 |
| 3,866,940 A | * | 2/1975 | Lewis ......................... 280/733 |
| 3,970,329 A | * | 7/1976 | Lewis ......................... 280/733 |
| 4,984,845 A | * | 1/1991 | Knoedler et al. ........... 297/250 |
| 5,062,662 A | | 11/1991 | Cameron |
| 5,390,953 A | * | 2/1995 | Tanaka et al. ............... 280/733 |
| 5,624,087 A | * | 4/1997 | Dick et al. ................ 242/381.1 |
| 5,765,869 A | * | 6/1998 | Huber ......................... 280/807 |
| 5,791,739 A | | 8/1998 | Lewis |
| 5,806,148 A | * | 9/1998 | McFalls et al. ................ 21/168 |
| 5,839,753 A | * | 11/1998 | Yaniv et al. ................. 280/733 |
| 6,019,388 A | | 2/2000 | Okazaki et al. |
| 6,126,194 A | * | 10/2000 | Yaniv et al. ................. 280/733 |
| 6,135,380 A | * | 10/2000 | Brown ......................... 280/806 |
| 6,135,563 A | * | 10/2000 | Yoshioka ..................... 297/470 |
| 6,142,511 A | * | 11/2000 | Lewis ......................... 280/733 |

* cited by examiner

Primary Examiner—Brian L. Johnson
Assistant Examiner—Kelly E Campbell
(74) Attorney, Agent, or Firm—Tarolli, Sundheim, Covell & Tummino L.L.P.

(57) ABSTRACT

A seat belt system (10) comprises a seat belt (15) and a tongue assembly (22). A buckle (26) engageable with the tongue assembly (22) secures the system (10) in a buckled condition in which the belt (15) is divided into a torso portion (28) and a lap portion (29). The system (10) also includes an inflatable device (100) comprising an inflatable portion (98) of the belt (15). An inflation fluid source (40) provides inflation fluid to the inflatable device (100) only when the tongue assembly (22) is engaged with the buckle (26). A cinch mechanism (130) has a cinched condition resisting movement of the belt (15) through the tongue assembly (22). The inflatable device (100), when inflated, causes the cinch mechanism (130) to move to the released condition and causes the torso portion (28) and the lap portion (29) of the belt (15) to be tensioned about the vehicle occupant.

25 Claims, 5 Drawing Sheets

TONGUE ASSEMBLY AND BUCKLE FOR INFLATABLE SEAT BELT

BACKGROUND OF THE INVENTION

1. Technical Field

The present invention relates to a seat belt system having an inflatable seat belt portion. In particular, the present invention relates to a tongue assembly and a buckle for use in such a seat belt system.

2. Description of the Prior Art

Inflatable seat belts are known. An inflatable seat belt is inflated by inflation fluid from an inflation fluid source. The inflation fluid is typically passed through one or more conduits to an inflatable portion of the seat belt, normally the torso portion, to inflate the inflatable portion.

The seat belt is typically a part of a seat belt system that includes a tongue assembly engageable with a buckle. The prior art shows various mechanisms for passing inflation fluid through, or past, the connection between the tongue assembly and the buckle.

SUMMARY OF THE INVENTION

The present invention is a seat belt system for helping to protect an occupant of a vehicle seat. The system comprises a seat belt, a tongue assembly through which the seat belt extends, and a buckle. The buckle is engageable with the tongue assembly to secure the seat belt system in a buckled condition in which the seat belt is divided by the tongue assembly into a torso portion that extends across the torso of the occupant and a lap portion that extends across the lap of the occupant. The seat belt system also includes an inflatable device comprising an inflatable portion of the seat belt. An inflation fluid source provides inflation fluid to the inflatable device only when the tongue assembly is engaged with the buckle. The system also includes a cinch mechanism having a cinched condition for resisting movement of the seat belt through the tongue assembly when the tongue assembly is engaged or disengaged with the buckle. The cinch mechanism also has a released condition. The inflatable device, when inflated, causes the cinch mechanism to move from the cinched condition to the released condition and causes the torso portion and the lap portion of the seat belt to be tensioned about the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figures 1, 2:
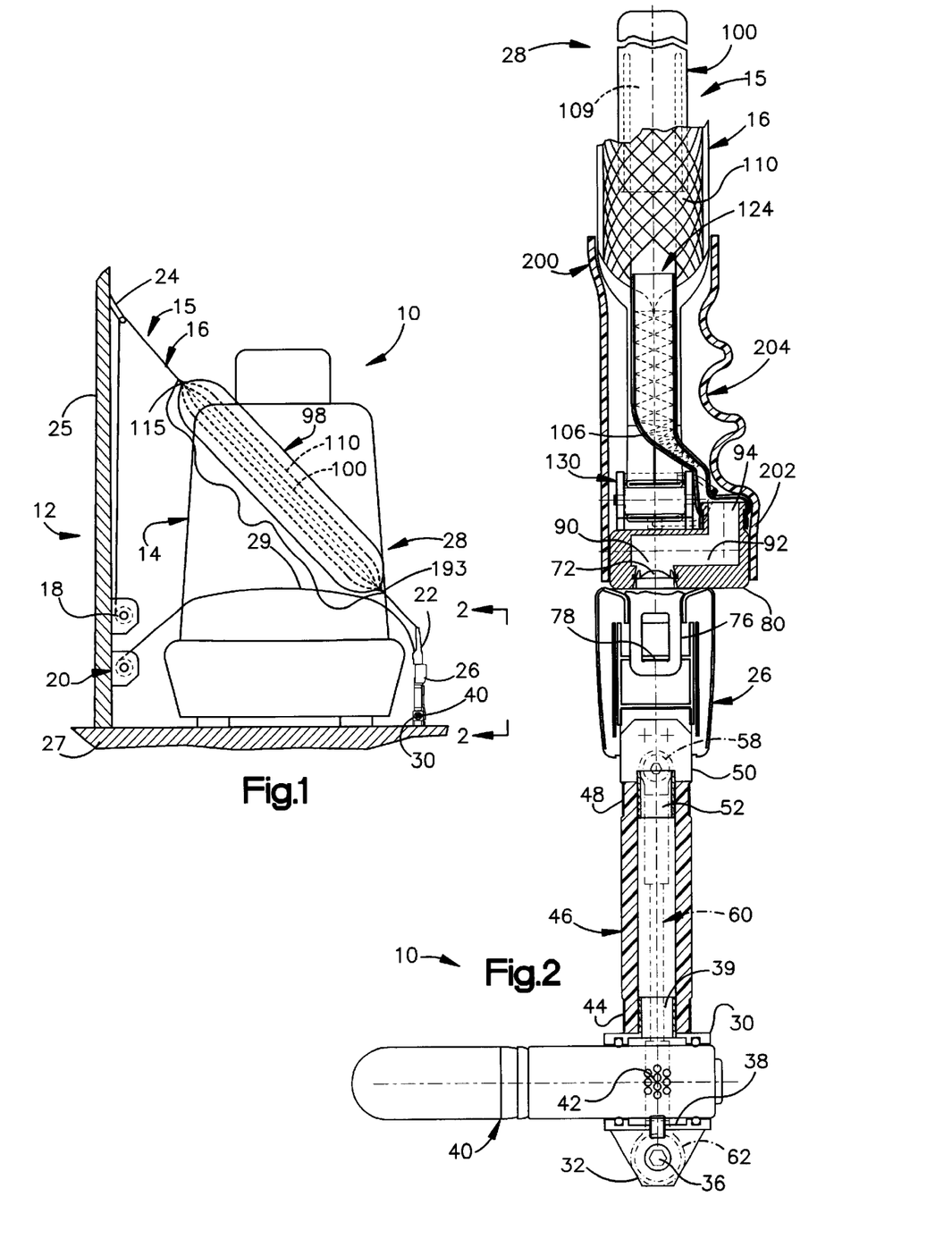
FIG. 1 is a schematic illustration of a vehicle seat belt system, including an inflatable portion, constructed in accordance with the present invention.
FIG. 2 is a sectional view of a portion of the seat belt system of FIG. 1, including a tongue assembly, a buckle, and an inflation fluid source, shown in the buckled condition before actuation of the inflation fluid source.

The present invention relates to a seat belt system for helping to protect an occupant. As representative of the invention, FIG. 1 illustrates a three-point continuous loop seat belt system 10 for use in helping to protect an occupant of a vehicle 12.

The occupant of the vehicle 12 sits on a vehicle seat 14, which is illustrated as a front passenger seat in the vehicle. A seat belt 15, which includes a length of seat belt webbing 16, is extensible about the vehicle occupant. One end of the seat belt 15 is attached to a torso belt retractor 18 located on one side of the seat 14. The opposite end of the seat belt 15 is attached to a lap belt retractor 20, which is secured to the vehicle B-pillar 25 on the same side of the seat 14. Intermediate its ends, the seat belt 15 passes through a tongue assembly 22 and a D-ring or turning loop 24 that is mounted to the B-pillar 25 above the retractors 18 and 20. When the seat belt system 10 is not in use, the seat belt 15 is wound on the retractors 18 and 20 and is oriented generally vertically on the one side of the seat 14.

To engage the seat belt system 10, the tongue assembly 22 is manually grasped and is pulled across the lap and torso of the occupant sitting in the seat 14. As the tongue assembly 22 is pulled across the lap and torso of the occupant, the belt webbing 16 of the seat belt 15 is unwound from the retractors 18 and 20. When the seat belt 15 has been pulled across the lap and torso of the occupant, the tongue assembly 22 is connected with a buckle 26, as shown in FIG. 1. The buckle 26 is connected to the vehicle body 27 and is disposed on the side of the seat 14 opposite the retractors 18 and 20. When the seat belt system 10 is thus buckled, the seat belt 15 is divided by the tongue assembly 22 into a torso portion 28, which extends across the torso of the occupant, and a lap portion 29, which extends across the lap of the occupant. Each one of the torso portion 28 and lap portion 29 includes a length of belt webbing 16.

As described below in detail, the seat belt 15 includes an inflatable portion 98 that can be inflated by an inflator 40 when the tongue assembly 22 is connected with the buckle 26. The inflator 40 is mounted between the buckle 26 and the vehicle body 27. Inflation fluid from the inflator 40 is delivered to the buckle 26. From the buckle 26, the inflation fluid can be delivered to the tongue assembly 22, when it is connected to the buckle. The inflatable portion 28 of the seat belt 15 is connected to the tongue assembly 22 and can be inflated by inflation fluid from the tongue assembly.

Figure 3:
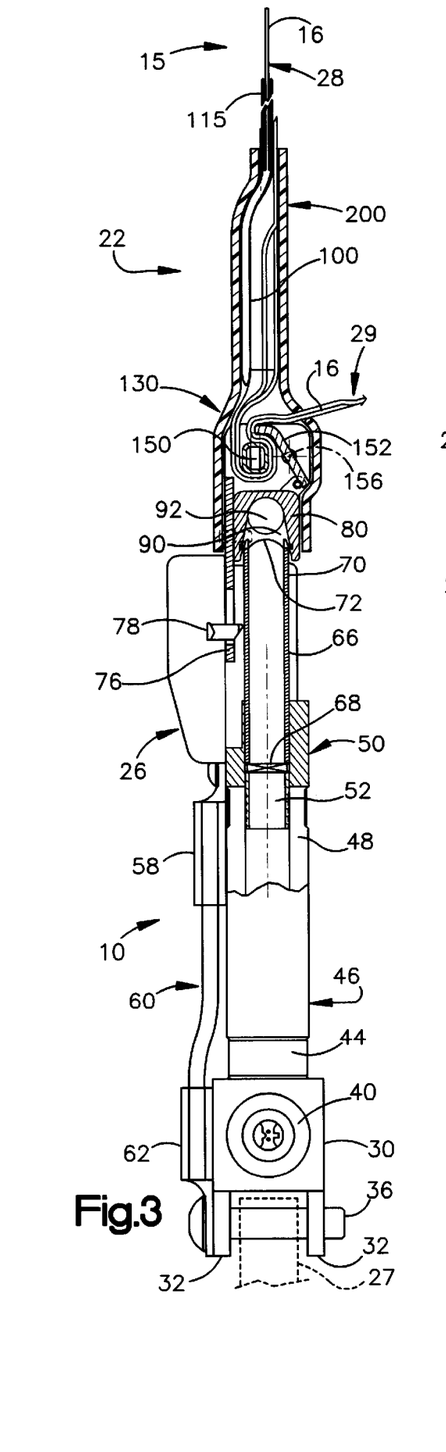
FIG. 3 is a view similar to FIG. 2 but taken at ninety degrees to FIG. 2.

More specifically, the seat belt system 10 includes an inflator manifold, or inflator housing, 30 (FIG. 2). The inflator housing 30 has a pair of mounting ears 32 (FIG. 3) for receiving a portion of the vehicle body 27. A bolt 36 extends through the mounting ears 32 to secure the inflator housing 30 to the portion of the vehicle body 27.

The inflator housing 30 has a tubular, cylindrical configuration defining an inflator chamber 38 in the inflator housing. A tubular outlet 39 of the inflator housing 30 extends radially outward from the inflator chamber 38.

The inflator 40 is mounted in the housing 30. The inflator 40 comprises a source of inflation fluid for inflating the inflatable portion 98 of the seat belt 15. The inflator 40 may contain an ignitable gas-generating material, which, when ignited, rapidly generates a large volume of gas. The inflator 40 may alternatively contain a stored quantity of pressurized inflation fluid, or a combination of pressurized inflation fluid and ignitable material for heating the inflation fluid. The inflator 40 has a plurality of fluid outlet openings 42 through which inflation fluid is directed into the inflation chamber 38 upon actuation of the inflator.

The seat belt system 10 includes a flexible conduit 46 for directing inflation fluid from the inflation chamber 38 to the buckle 26. A first end portion 44 of the flexible conduit 46 is mounted on the outlet 39 of the inflator housing 30. The flexible conduit 46 extends away from the inflator housing 30 and terminates in a second end portion 48 of the flexible conduit.

The buckle 26 includes a housing 50. The housing 50 has a tubular fluid inlet 52. The second end portion 48 of the flexible conduit 46 is connected with the fluid inlet 52 of the buckle housing 50. The flexible conduit 46 supports the buckle 26 at a location spaced apart from the inflator housing 30 and from the vehicle body 27.

The seat belt system 10 includes a flexible anchor 60 (FIGS. 2 and 3) for transmitting loads from the buckle 26 to the vehicle body 27, so that the loads do not overstress the flexible conduit 46. An upper end portion 58 of the anchor 60 is connected with the buckle housing 50. A lower end portion 62 of the anchor 60 is connected with the vehicle body 27 by the fastener 36. The anchor 60 is made from a material strong enough to withstand crash loads of a vehicle occupant that may be transmitted into the buckle 26. The anchor 60 may be made from stainless steel cable, for example.

An upper conduit 66 (FIG. 3) is located in the buckle housing 50 and is in fluid communication with the fluid inlet 52. The upper conduit 66 is supported in the buckle housing 50 for sliding movement relative to the buckle housing. A spring 68 biases the upper conduit 66 away from the fluid inlet 52. An outer end portion 70 of the upper conduit 66 projects from the buckle housing 50. The outer end portion 70 of the upper conduit 66 terminates in a rupturable membrane or burst disk 72.

The buckle 26 has an upwardly facing opening for receiving a latch plate 76 of the tongue assembly 22, in a manner described below. A latch member 78 of the buckle 26 assembly is movable into engagement with the latch plate 76 of the tongue assembly 22, in a known manner, to secure or lock the tongue assembly 22 to the buckle 26.

Figure 8:
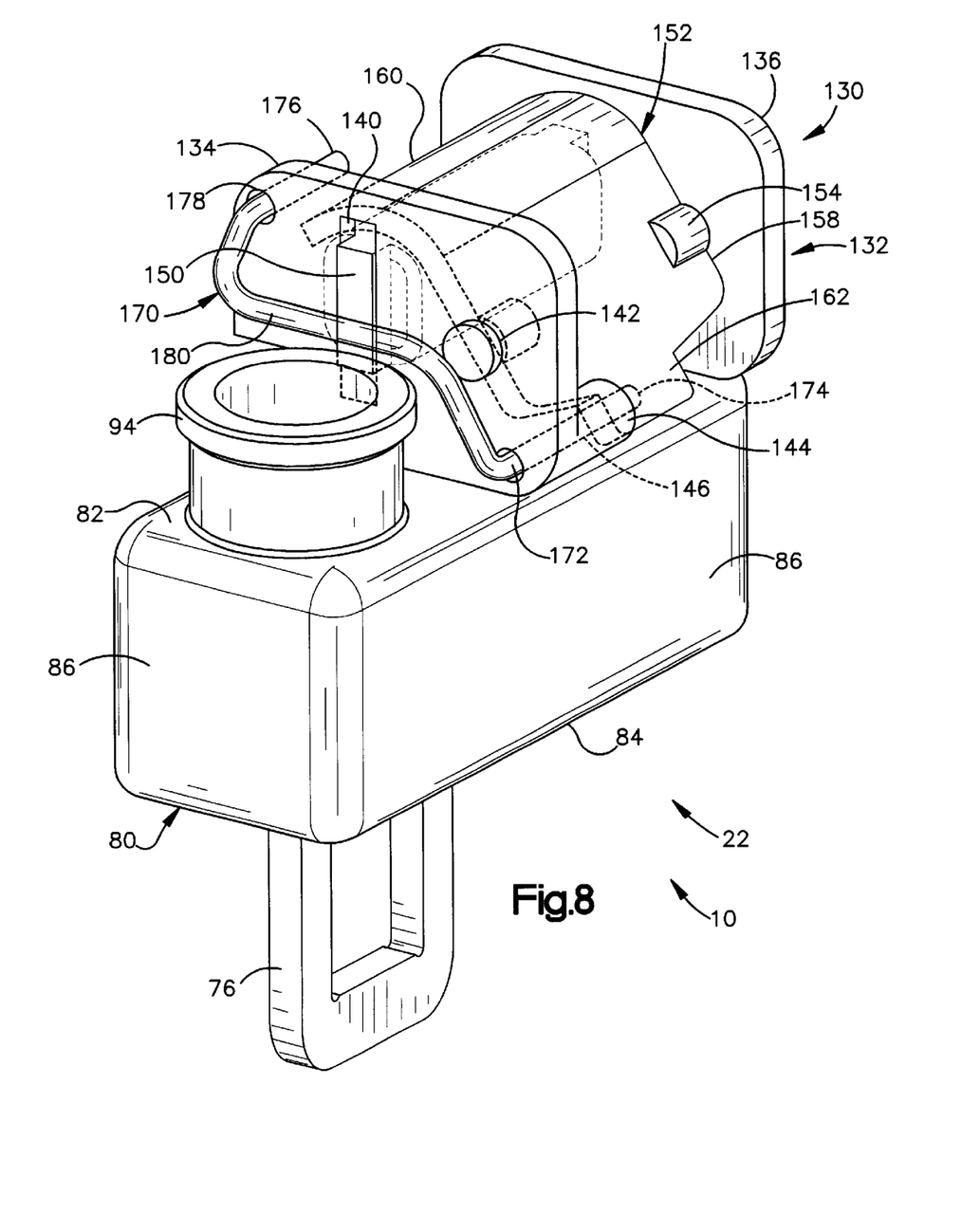
FIG. 8 is a perspective view of a portion of the tongue assembly of FIG. 2.

The tongue assembly 22 includes a base 80 that supports the other portions of the tongue assembly and that helps to direct inflation fluid from the upper conduit 66 to the inflatable portion 98 of the seat belt 15. The base 80 has a box-shaped configuration including a top wall 82 (FIG. 8), a bottom wall 84, and four side walls 86. The latch plate 76 projects downward from the bottom wall 84 of the base 80.

A fluid inlet 90 (FIG. 4) is located in the bottom wall 84 of the base 80 for connection with the upper conduit 66 of the buckle housing 50. The fluid inlet 90 is in fluid communication with a fluid flow passage 92 located in the base 80. The fluid flow passage 92 extends upward from the fluid inlet 90, laterally through the base 80, then upward, and terminates in a fluid outlet 94. The fluid outlet 94 has a tubular configuration and projects upward from the top wall 82 of the base 80.

Secured in fluid communication to the fluid outlet 94 of the base 80 of the tongue assembly 22 is the inflatable portion 98 (FIGS. 1 and 4) of the seat belt 15. The inflatable portion 98 (FIG. 4) includes an inflatable bladder 100, which receives inflation fluid from the inflator 40, and a braided tube 110. The bladder 100 and tube 110 are, preferably, of a construction generally similar to that shown in U.S. Pat. No. 5,839,753, such that when the bladder is inflated, the tube expands radially and contracts in length. The invention is applicable to other types of inflatable seat belts, also. The inflatable portion 98 extends along a portion of the belt webbing 16 that is included in the torso portion 28 of the seat belt 15 and helps to protect the occupant of the vehicle seat 14, as described below.

The bladder 100 is made from a non-elastic material, such as a thin woven material commonly used for air bags. The bladder 100 has a tubular main body portion 102 that extends along a section 104 of the torso portion 28 of seat belt 15. A neck portion 106 of the bladder 100 extends from the main body portion 102. The neck portion 106 of the bladder 100 is secured around the fluid outlet 94 of the tongue assembly base 80 with a compression clamp (not shown). As a result, the bladder 100 is in fluid communication with the fluid flow passage 92 in the tongue assembly base 80.

Figure 4:
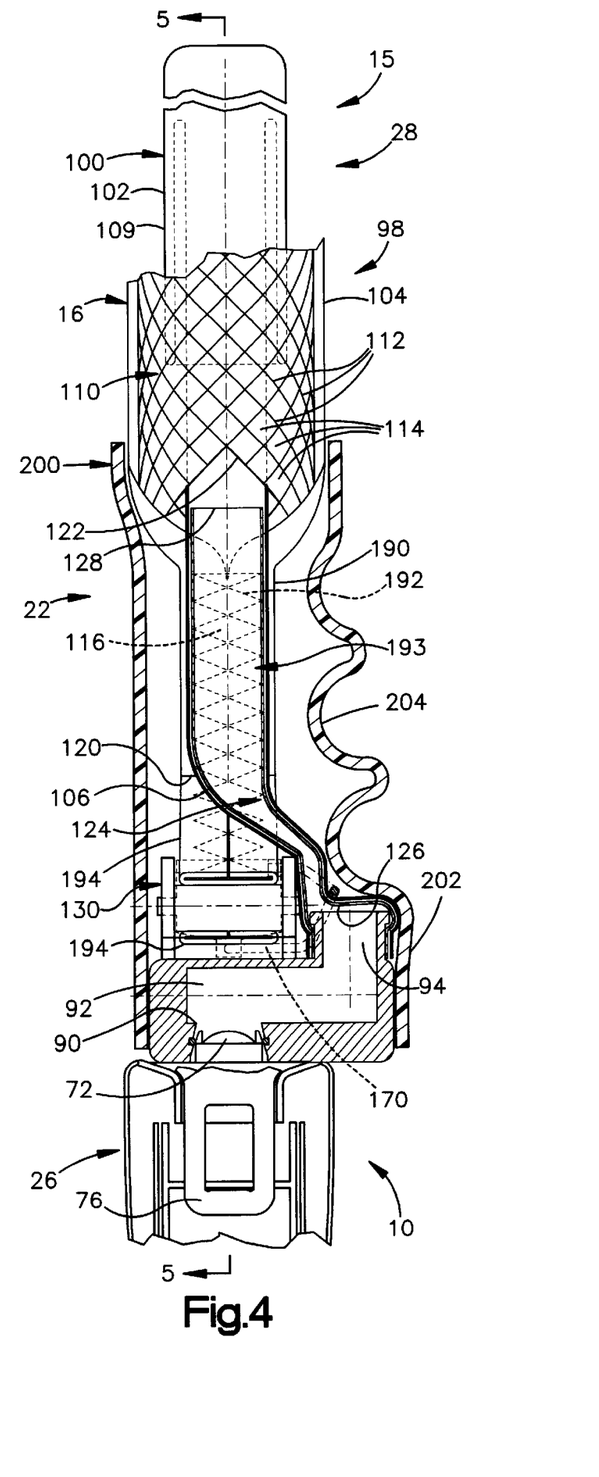
FIG. 4 is an enlarged view of a portion of FIG. 2.

A section 109 of the main body portion 102 of the bladder 100 is folded within itself, or telescoped, as shown in FIG. 4. The bladder section 109, because it is telescoped, is extensible without placing significant tensile load on the material of the bladder 100. The extended length of the telescoped bladder section 109 may be in the range of from about 100 mm in length to about 200 mm.

The braided tube 110 is made from a plurality of filaments 112 secured together in a manner so that when the tube is expanded radially, it simultaneously contracts in length. The tube 110 has an open mesh construction so that openings 114 are formed between adjacent groups of filaments 112. The filaments 112 are flexible, and the openings 114 change shape and size when the tube 110 is expanded in diameter and contracts in length.

The upper end portion of the braided tube 110 is securely sewn to the seat belt webbing 16 in the torso portion 28 at an upper attachment point 115 (FIG. 1).

The filaments 112 of the braided tube 110 have lower end portions 116. The lower end portions 116 of the filaments 112 are gathered into a closely packed bunch and terminate at the location indicated by the line 120 in FIG. 4. The lower end portions 116 of the filaments 112 are sewn to the belt webbing 16 with a series of stitches 192, in a manner described below. As a result, both ends of the braided tube 110 are securely fastened to the seat belt webbing 16, at locations spaced apart from each other.

The main body portion 102 of the bladder 100 (FIG. 4) is disposed within the braided tube 110. The neck portion 106 of the bladder 100 extends out of the braided tube 110 through an opening 122 between adjacent filaments 112. Thus, the neck portion 106 of the bladder 100 is not located in the braided tube 110.

The seat belt system 10 includes a feed tube 124 for protecting the neck portion 106 of the bladder 100. The feed tube 124 is located inside of, and is coextensive with, the neck portion 106 of the bladder 100. The feed tube 124 is made from a material that is more heat resistant than the material of the bladder 100, such as woven Kevlar. An end portion 126 of the feed tube 124 is secured around the outlet 94 of the tongue assembly base 80, inside the neck portion 106 of the bladder 100. As a result, the interior of the feed tube 124 is in fluid communication with the fluid flow passage 92 in the buckle housing. The opposite end 128 of the feed tube 124 is located inside the bladder 100, so that inflation fluid flowing from the tongue assembly base 80 flows through the feed tube 124 into the bladder 100.

The tongue assembly 22 includes a cinch mechanism 130 located on the top wall 82 of the base 80. The cinch mechanism 130 is operable to resist movement of the seat belt webbing 16 through the tongue assembly 22 when the tongue assembly is engaged with the buckle 26 as described below.

The cinch mechanism 130 (FIG. 8) has a generally U-shaped cross-sectional frame 132 that includes two side walls 134 and 136 and a portion of the top wall 82 of the base 80. A pair of slots 140 are formed in the side walls 134 and 136 of the cinch mechanism 130. The slots 140 extend in a direction parallel to the latch plate 76. In addition, a pair of circular openings 142 are formed in the side walls 134 and 136 of the cinch mechanism 130.

The one side wall 134 includes a short boss 144 (FIGS. 7 and 8) that extends inward in a direction toward the opposite side wall 136. The boss 144 has a cylindrical opening 146 that extends completely through the boss 144 and through the side wall 134.

A cinch bar 150 is located between the side walls 134 and 136 of the cinch mechanism 130. The cinch bar 150 is supported in the slots 140 for sliding movement in a direction parallel to the latch plate 76.

A lock link 152 is located between the side walls 134 and 136 of the cinch mechanism 130. The lock link 152 and cinch bar 150 are operative, as described below, to block movement of the belt webbing 16 through the tongue assembly 22.

The lock link 152 has a pair of pivot pins 154 received in the circular openings 142 in the side walls 134 and 136. The pivot pins 154 support the lock link 152 for pivotal movement relative to the side walls 134 and 136 about an axis 156 (FIG. 7) extending through the pivot pins 154.

The lock link 152 has a generally L-shaped cross-sectional configuration. The L-shaped configuration of the lock link 152 includes a first arm 158 and a second arm 160. The first arm 158 has a locking tab 162 that extends down toward the top wall 82 of the base 80. The pivot pins 154 are located on the first arm 158. The second arm 160 is adjacent to, and extends over, the upper portion of the cinch bar 150.

The cinch mechanism 130 also includes a release pin 170 for releasably holding the lock link 152 in a locking position. The release pin 170 is made from a relatively thin material, such as steel wire, formed to the illustrated configuration. The release pin 170 has a first end portion 172 received in the opening 146 in the boss 144. A first terminal end 174 of the release pin 170 projects from the boss 144 and is located adjacent the locking tab 162 of the lock link 152. A second end portion 176 of the release pin 170 is received in an opening 178 in the side wall 134 of the cinch mechanism 130. An intermediate portion 180 of the release pin 170 extends across the fluid outlet 94 of the tongue assembly base 80.

Figure 7:
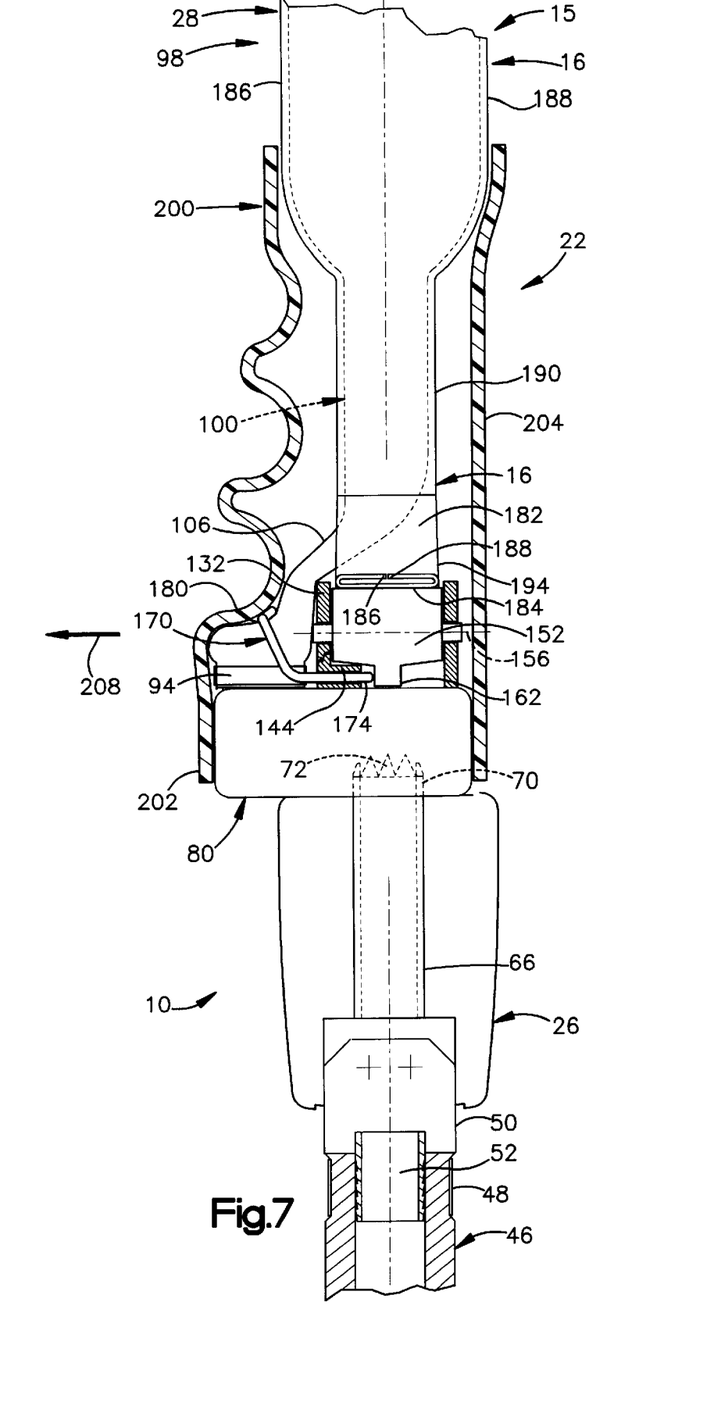
FIG. 7 is a further enlarged view of a portion of the seat belt system shown in a condition after actuation of the inflation fluid source taken along view line 7—7 in FIG. 6.

As shown in FIG. 7, the seat belt webbing 16 has a flat, rectangular cross-sectional configuration including first and second opposite major side surfaces 182 and 184. The seat belt webbing 16 has first and second edges 186 and 188.

A section 190 of the seat belt webbing 16 that overlies the end portions 116 of the filaments 112 is folded over as shown in FIGS. 4 and 7 to make the seat belt webbing narrower. The folded section 190 of the seat belt webbing 16 is sewn together with the series of stitches 192. The stitches 192 extend through the lower end portions 116 of the filaments 112, and the sewn seat belt webbing 190 thus captures and secure the end portions of the filaments, to form a lower attachment point 193 of the seat belt 16.

Figure 5:
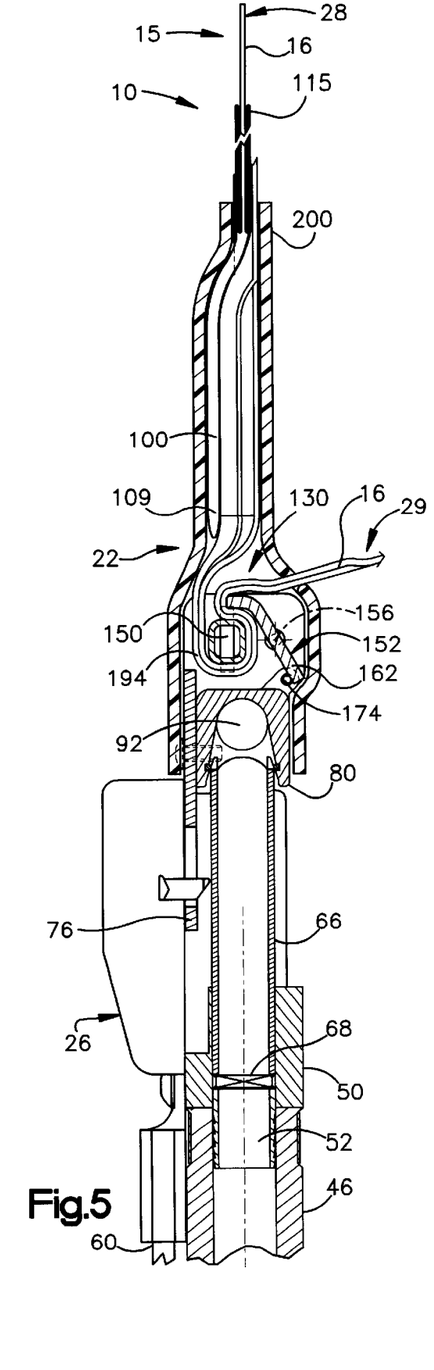
FIG. 5 is an enlarged view of a portion of FIG. 3 taken along view line 5—5 in FIG. 4.
Figure 6:
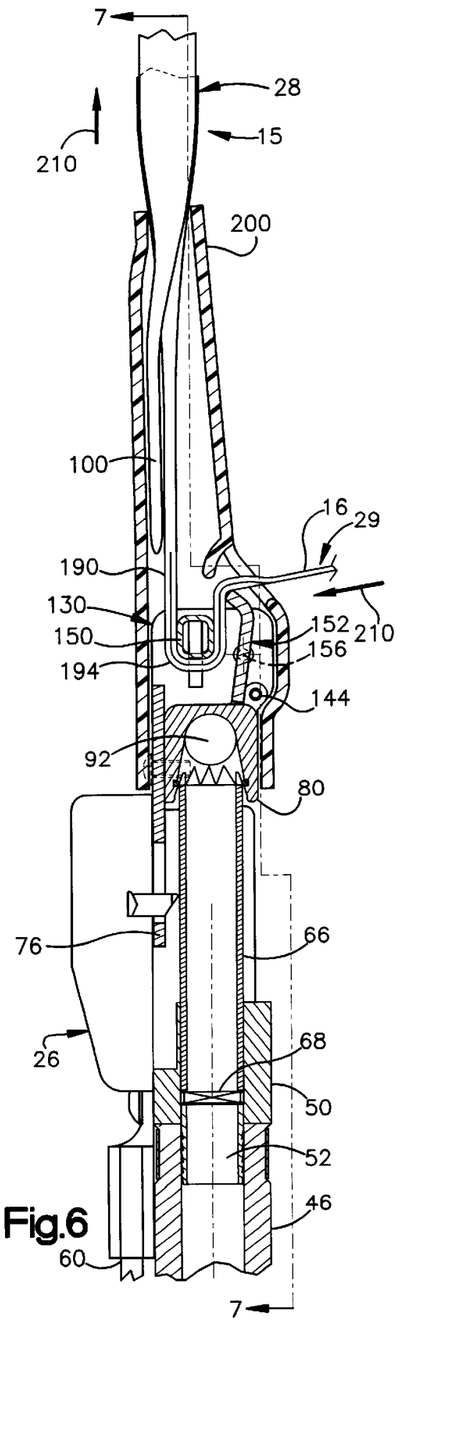
FIG. 6 is a view similar to FIG. 5 showing the seat belt system after actuation of the inflation fluid source.

The belt webbing section 190 and the filaments 112 do not extend through the cinch mechanism 130. Instead, another section 194 of the seat belt webbing 16 extends toward and into the cinch mechanism 130. The webbing section 194 extends from the lower attachment point 193 and is folded over and sewn to itself like the webbing section 190 (FIG. 6). The webbing section 194 is stitched with a continuation of the stitching section 192. The webbing section 194 extends in the folded and sewn state through the cinch mechanism 130 of the tongue assembly 22, as best seen in FIG. 5. As a result, the cinch mechanism 130 and the base are narrower than they would be were the seat belt webbing not folded over and sewn to itself.

The folded webbing section 194 exits the tongue assembly 22 in the folded and sewn state to form the lap portion 29 of the seat belt 15. The belt webbing 16 unfolds to its original width to extend across the lap of the occupant of the seat 14 as the lap portion 29 of the seat belt 15.

The tongue assembly 22 includes a molded plastic cover, or handle 200, that covers and protects the internal parts of the tongue assembly. A first portion 202 of the cover 200 encloses the base 80 and the outlet 94. A second portion 204 of the cover 200 encloses the folded section 190 of the belt webbing, the lower end portions 116 of the filaments 112, and the neck portion 106 of the bladder 100. The second portion 204 of the cover 200 extends upward past the point where the bladder 100 exits the braided tube 110 through the opening 122. The second portion 204 of the cover 200 is corrugated, like a bicycle handlebar grip. The cover 200 is made from a plastic material that is rigid enough to hold its shape when grabbed by a vehicle occupant and to protect the internal parts of the tongue assembly 22.

When the tongue assembly 22 is disengaged from the buckle 26, the fluid inlet 90 in the base 80 of the tongue assembly is uncovered. Fluid from the inflator can not be passed through the buckle 26 and the tongue assembly 22 to inflate the inflatable portion 98 of the seat belt 15.

When a vehicle occupant thereafter engages the tongue assembly 22 with the buckle 26, the latch member 78 moves into engagement with the latch plate 76 to secure or lock the tongue assembly 22 to the buckle. The inlet 90 on the base 80 of the tongue assembly 22 engages the outer end portion 70 of the movable conduit 66 of the buckle assembly 26. This engagement moves the movable conduit 66 downward in the buckle housing 50, against the bias of the spring 68. The rupturable membrane 72 on the movable conduit 66 is in engagement with the inlet 90 on the base 80 of the tongue assembly 22. Because the rupturable membrane 72 is unruptured, the bladder 100 is not connected in fluid communication with the inflator 40, and the bladder remains in the uninflated condition.

Under normal use, whether the tongue assembly 22 is engaged with the buckle or not, the cinch mechanism 130 clamps the seat belt 15 in the tongue assembly 22 . Specifically, the forces acting on the belt webbing 16 cause the cinch bar 150 to move into a cinching position as shown in FIG. 5. In this position, the cinch bar 150 cooperates with the base 80 of the tongue assembly 22, and with the lock link 152, to resist movement of the belt webbing 16 through the tongue assembly.

At the same time, the terminal end portion 174 of the release pin 170 engages the locking tab 162 of the lock link 152. This engagement blocks the lock link 152 from pivoting in a clockwise direction as viewed in FIGS. 5 and 6. This prevents the second arm 160 of the lock link 152 from moving away from the cinch bar 150. The folded seat belt webbing section 194 is clamped between the cinch bar 150 and the lock link 152, and as a result, the seat belt webbing can not be pulled through the tongue assembly 22.

Upon the occurrence of an event for which protection of the vehicle occupant is desired, such as a vehicle collision, the torso belt retractor 18 and the lap belt retractor 20 are locked, preventing withdrawal of belt webbing 16 from the retractors. In addition, the inflator 40 is actuated, to inflate the inflatable portion 98 of the seat belt 15.

Upon actuation of the inflator 40, inflation fluid flows from the inflation fluid outlets 42 of the inflator into the chamber 38 in the inflator housing 30. The inflation fluid exits the housing through the outlet 39 and flows into the flexible conduit 46. The fluid flows from the flexible conduit 46 into the upper conduit 66 in the buckle 26.

The pressure in the upper conduit 66 increases until the rupturable membrane 72 at the end of the upper conduit ruptures. Inflation fluid flows through the inlet 90 of the tongue assembly base 80, into the fluid flow passage 92. The inflation fluid exits the passage 92 through the outlet 94, and flows into the feed tube 124, which is disposed within the bladder 100.

The force of the inflation fluid flowing into the feed tube 124 and bladder 100 causes the end portion 126 of the feed tube, and the neck portion 106 of the bladder 100, to begin to inflate. As they inflate, they apply force to the intermediate portion 180 of the release pin 170. The force applied to the release pin 170 by the inflating feed tube 124 and bladder 100 has a significant component that acts in a direction away from the cinch assembly frame 132 of the tongue assembly base 80, as indicated by the arrow 208 in FIG. 7. This force causes the intermediate portion 180 of the release pin 170 to move away from the fluid outlet 94 of the tongue assembly base 80.

When this movement occurs, the release pin 170 no longer clamps the end portion 126 of the feed tube 124, and the neck portion 106 of the bladder 100, against the fluid outlet 94 of the tongue assembly base 80. Inflation fluid can flow freely into the feed tube 124 and the bladder 100.

As the inflation fluid flows into the feed tube 124 and the bladder 100, the bladder expands radially. The radial expansion of the bladder 100 causes the braided tube 110 to expand radially. The radial expansion of the braided tube 110 and bladder 100 provides an inflated portion 98 of the seat belt 16 located in front of the torso of the occupant of the vehicle seat 14, as shown in dashed lines in FIG. 1, that can help to protect the occupant.

As the braided tube 110 expands radially, it contracts in length between the upper attachment point 115 and the lower attachment point 193. This lengthwise contraction of the braided tube 110 results in a shortening of the distance between the upper attachment point 115 and the lower attachment point 193. This causes the portion of the webbing 16 that is located between the upper attachment point 115 and the lower attachment point 193 to become slack, as shown in FIG. 1. The braided tube, however, is fixed between the upper attachment point 115 and the lower attachment point 193, and carries the load between those points. As a result, slack is effectively removed from the torso portion 28 of the seat belt 16, to help protect the occupant of the vehicle seat 14.

During the inflation of the bladder 100, the force of the inflation fluid flowing rapidly into the bladder exerts a tensile force on the bladder, tending to stretch the bladder lengthwise. Because the bladder 100 is made from an inelastic material, excessive tensile force could conceivably damage the bladder. The presence of the telescoped section 109 of the bladder 100 prevents this from happening. As the bladder 100 inflates, the telescoped section 109 of the bladder unfolds, allowing the bladder to lengthen and dissipating the force of the inflation fluid. In addition, the extending of the telescoped section 109 prevents any tensile force caused by the axial contraction of the tube 110 from being transmitted to the bladder neck portion 106, thus maintaining the connection between the bladder 100 and the inflator 40.

The movement of the release pin 170 away from the tongue assembly base 80, in addition to enabling the bladder 100 to inflate as described above, also enables the cinch mechanism 130 to release. Specifically, when the release pin 170 moves away from the tongue assembly base 80, the first end portion 172 of the release pin moves in the opening 146 in the boss 144. The terminal end 174 of the release pin 170 moves out of engagement with the locking tab 162 on the lock link 152.

The lock link 152 becomes free to pivot about its pivot pins 154. The lock link 152 pivots in a clockwise direction, as viewed in FIGS. 5 and 6, under force applied by the seat belt webbing 16. As the lock link 152 pivots, the second arm 160 of the lock link moves away from the cinch bar 150. The cinch bar 150 moves in the slots 140, under force applied by the belt webbing 16. The belt webbing section 194 is thus movable through the cinch mechanism 130 of the tongue assembly 22.

As the distance between the upper and lower attachment points 115 and 193 decreases because of the contraction of the tube 110, the lower attachment point 193 of the seat belt 15 is pulled upward, that is, in a direction away from the tongue assembly 192. Because the cinch mechanism 130 is in the released condition upon actuation of the inflator 40, the belt webbing section 194 is pulled through the cinch mechanism, from the lap portion 29 into the torso portion 28, in a direction as indicated by the arrows 210 in FIG. 6.

This displacement of belt webbing 16 from the lap portion 29 of the seat belt 15 results in a tightening of the lap portion, because the lap belt retractor 20 is locked. As discussed above, the torso portion 28 of the seat belt 15 is simultaneously tensioned. Thus, actuation of the inflator 40 not only inflates the inflatable portion 98 of the seat belt 15, but also pretensions both the lap portion 29 and the torso portion 28 of the seat belt 15.

The tightening of the lap portion 29 of the seat belt 15 continues as long as the bladder 100 is still inflating. Once the tensile force exerted by the inflating bladder 100 no longer exceeds the resistive force offered by the tightening lap portion 29, the lap portion stops tightening.

From the above description of the invention, those skilled in the art will perceive improvements, changes and modifications in the invention. Such improvements, changes and modifications are intended to be included within the scope of the appended claims.

Having described the invention, we claim:

1. A seat belt system for helping to protect an occupant of a vehicle seat, comprising:

a seat belt;

a tongue assembly through which said seat belt extends;

a buckle engageable with said tongue assembly to secure said seat belt system in a buckled condition in which said seat belt is divided by said tongue assembly into a torso portion that extends across the torso of the occupant and a lap portion that extends across the lap of the occupant;

an inflatable device comprising an inflatable portion of said seat belt;

an inflation fluid source for providing inflation fluid to said inflatable device only when said tongue assembly is engaged with said buckle; and a cinch mechanism having a cinched condition for resisting movement of said seat belt through said tongue assembly when said tongue assembly is engaged or disengaged with said buckle and having a released condition, said inflatable device when inflated causing said cinch mechanism to move from the cinched condition to the released condition and causing said torso portion and said lap portion of said seat belt to be tensioned about the vehicle occupant.

2. A seat belt system as set forth in claim 1 wherein said inflatable device comprises an inflatable portion of said seat belt.

3. A seat belt system as set forth in claim 2 wherein said inflatable portion of said seat belt forms a part of said torso portion of said seat belt.

4. A seat belt system as set forth in claim 1 wherein said inflatable device comprises an inflatable bladder and a tube extending around said inflatable bladder which, when said bladder is inflated, contracts in length and increases in diameter.

5. A seat belt system as set forth in claim 4 wherein said tube is braided and is rigidly attached at both ends to said torso portion of said seat belt whereby upon contracting said tube significantly retracts or tensions said seat belt webbing.

6. A seat belt system as set forth in claim 5 wherein a necked down portion of said inflatable bladder extends out of an opening in said tube for connection with said inflation fluid source.

7. A seat belt system as set forth in claim 6 wherein said inflatable portion of said seat belt forms a part of said torso portion of said seat belt.

8. A seat belt system as set forth in claim 7 wherein said inflatable device comprises an inflatable bladder and a tube extending around said inflatable bladder which, when said bladder is inflated, contracts in length and increases in diameter.

9. A seat belt system as set forth in claim 8 wherein said tube is made from a plurality of filaments joined together in a tubular configuration and having a main body portion and a first end portion that includes end portions of said plurality of filaments, said bladder having a first end portion extending out of an opening in said main body portion of said tube between adjacent ones of said filaments, said first end portion of said bladder being fixed to said tongue assembly, said first end portion of said tube not being fixed to said tongue assembly.

10. A seat belt system as set forth in claim 1 for mounting on a vehicle body, comprising a flexible conduit extending between said inflation fluid source and said buckle for directing inflation fluid to said buckle upon actuation of said inflation fluid source, and a flexible anchor extending parallel to said flexible conduit between said buckle and the vehicle body for transmitting force between said buckle and the vehicle body to minimize transmission of force through said conduit between said buckle and the vehicle body.

11. A seat belt system for helping to protect a vehicle occupant, comprising:

a seat belt comprising a continuous length of webbing material having a torso portion and a lap portion;

a tongue assembly on said seat belt;

a buckle engageable with said tongue assembly to secure said seat belt system;

an inflatable bladder extending along said torso portion of said seat belt;

a tube extending around said inflatable bladder which, when said bladder is inflated, contracts in length and increases in diameter;

said tube being made from a plurality of filaments joined together and having a main body portion and a first end portion and an opposite second end portion, said first end portion of said tube including end portions of said plurality of filaments connected to said webbing material of said torso portion at a location near said tongue assembly, said second end portion being connected to said webbing material of said torso portion at a location spaced from said tongue assembly and spaced from said first end portion;

said bladder having a first end portion extending lout of an opening in said main body portion of said tube between adjacent ones of said filaments, and said first end portion of said bladder being fixed to said tongue assembly.

12. A seat belt system as set forth in claim 11 wherein said tube is braided.

13. A seat belt system as set forth in claim 11 further comprising a feed tube for protecting said bladder, said feed tube being located inside of and coextensive with a neck portion of said bladder, said feed tube being made from a material that is more heat resistant than the material of said bladder.

14. A seat belt system as set forth in claim 11 wherein said first end portion of said tube is fixed to said seat belt and is not fixed to said tongue assembly.

15. A seat belt system as set forth in claim 11 wherein said seat belt has a first portion folded over and sewn to itself with a first stitching section to make said seat belt narrower and to secure said first end portion of said braided tube to said seat belt.

16. A seat belt system as set forth in claim 11 wherein said seat belt comprises belt webbing having a first portion along which said bladder and braided tube extends, said belt webbing having a second portion that extends through a releasable cinch mechanism.

17. A seat belt system as set forth in claim 16 wherein said seat belt has a first portion folded over and sewn to itself with a first stitching section to make said seat belt and said cinch mechanism narrower.

18. A seat belt system for helping to protect a vehicle occupant, comprising:

a seat belt;

a tongue assembly through which said seat belt extends;

a buckle engageable with said tongue assembly to secure said seat belt system in a buckled condition in which said seat belt is divided by said tongue assembly into a torso portion that extends across the torso of the occupant and a lap portion that extends across the lap of the occupant;

said tongue assembly having a cinch mechanism that resists movement of said seat belt through said tongue assembly when said tongue assembly is engaged or disengaged with said buckle;

an inflatable device extending along said torso portion of said seat belt; and an actuatable inflation fluid source for providing inflation fluid to said inflatable device when said tongue assembly is engaged with said buckle;

said cinch mechanism releasing said seat belt for movement through said tongue assembly upon actuation of said inflation fluid source.

19. A seat belt system as set forth in claim 18 wherein said tongue assembly includes a member movable by said device when said device is inflating to effect release of said cinch mechanism.

20. A seat belt system as set forth in claim 19 wherein said seat belt has a webbing portion folded over and sewn to itself to make said seat belt and said cinch mechanism narrower, said webbing portion extending through said cinch mechanism in the folded and sewn state and being clampable by said cinch mechanism.

21. A seat belt system as set forth in claim 18 wherein said inflatable device when inflated causes said torso portion and said lap portion of said seat belt to be tensioned about the vehicle occupant.

22. A seat belt system as set forth in claim 18 wherein said inflatable device when inflated causes part of said lap portion of said seat belt to be pulled through said cinch mechanism to tension said lap portion about the vehicle occupant.

23. A seat belt system as set forth in claim 18 including a corrugated plastic handle that extends over and covers said tongue assembly to protect said cinch mechanism and to facilitated occupant handling of said tongue assembly.

24. A seat belt system for helping to protect a vehicle occupant, comprising:
   a seat belt having a torso portion;
   a tongue assembly on said seat belt;
   a buckle engageable with said tongue assembly to secure said seat belt system;
   an inflatable bladder extending along said torso portion of said seat belt;
   a tube extending around said inflatable bladder which, when said bladder is inflated, contracts in length and increases in diameter, said tube being made from a plurality of filaments joined together and having a main body portion and a first end portion, said first end portion of said tube including end portions of said plurality of filaments;
   said bladder having a first end portion extending out of an opening in said main body portion of said tube between adjacent ones of said filaments, and said first end portion of said bladder being fixed to said tongue assembly; and
   a feed tube for protecting said bladder, said feed tube being located inside of and coextensive with a neck portion of said bladder, said feed tube being made from a material that is more heat resistant than the material of said bladder.

25. A seat belt system for helping to protect a vehicle occupant, comprising:
   a seat belt having a torso portion;
   a tongue assembly on said seat belt;
   a buckle engageable with said tongue assembly to secure said seat belt system;
   an inflatable bladder extending along said torso portion of said seat belt;
   p a tube extending around said inflatable bladder which, when said bladder is inflated, contracts in length and increases in diameter;
   said tube being made from a plurality of filaments joined together and having a main body portion and a first end portion, said first end portion of said tube including end portions of said plurality of filaments;
   said bladder having a first end portion extending out of an opening in said main body portion of said tube between adjacent ones of said filaments, and said first end Portion of said bladder being fixed to said tongue assembly;
   said seat belt comprising belt webbing having a first portion along which said bladder and braided tube extends, said belt webbing having a second portion that extends through a releasable cinch mechanism.

* * * * *